July 27, 1954
A. W. RAFFERTY
2,684,860
QUICK LOCK RING SEAL COUPLING FOR CONDUITS
Filed March 31, 1951
2 Sheets-Sheet 2
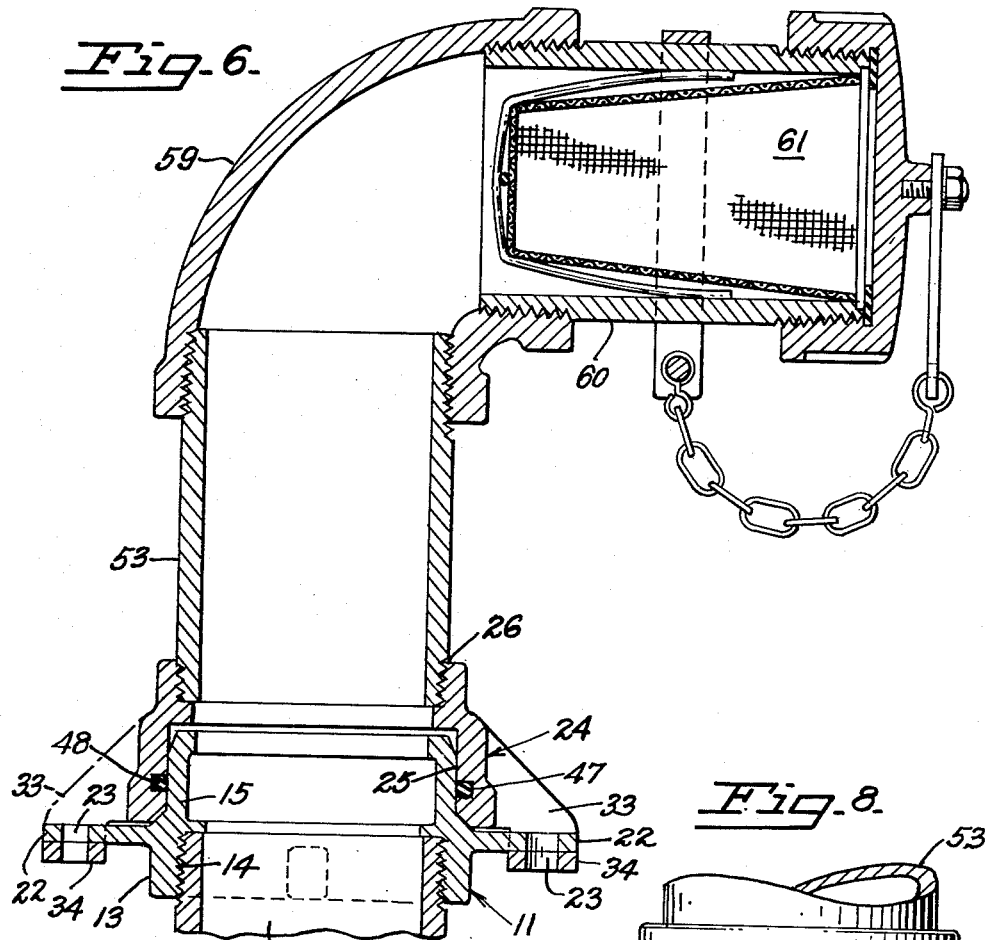
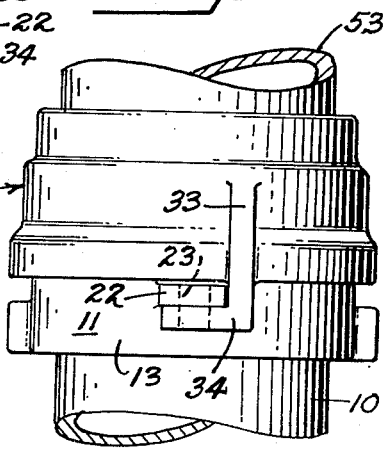
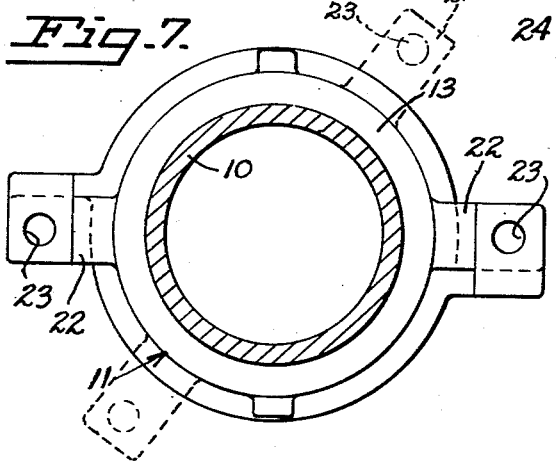
INVENTOR
ARTHUR W. RAFFERTY
BY
ATTORNEY Patented July 27, 1954

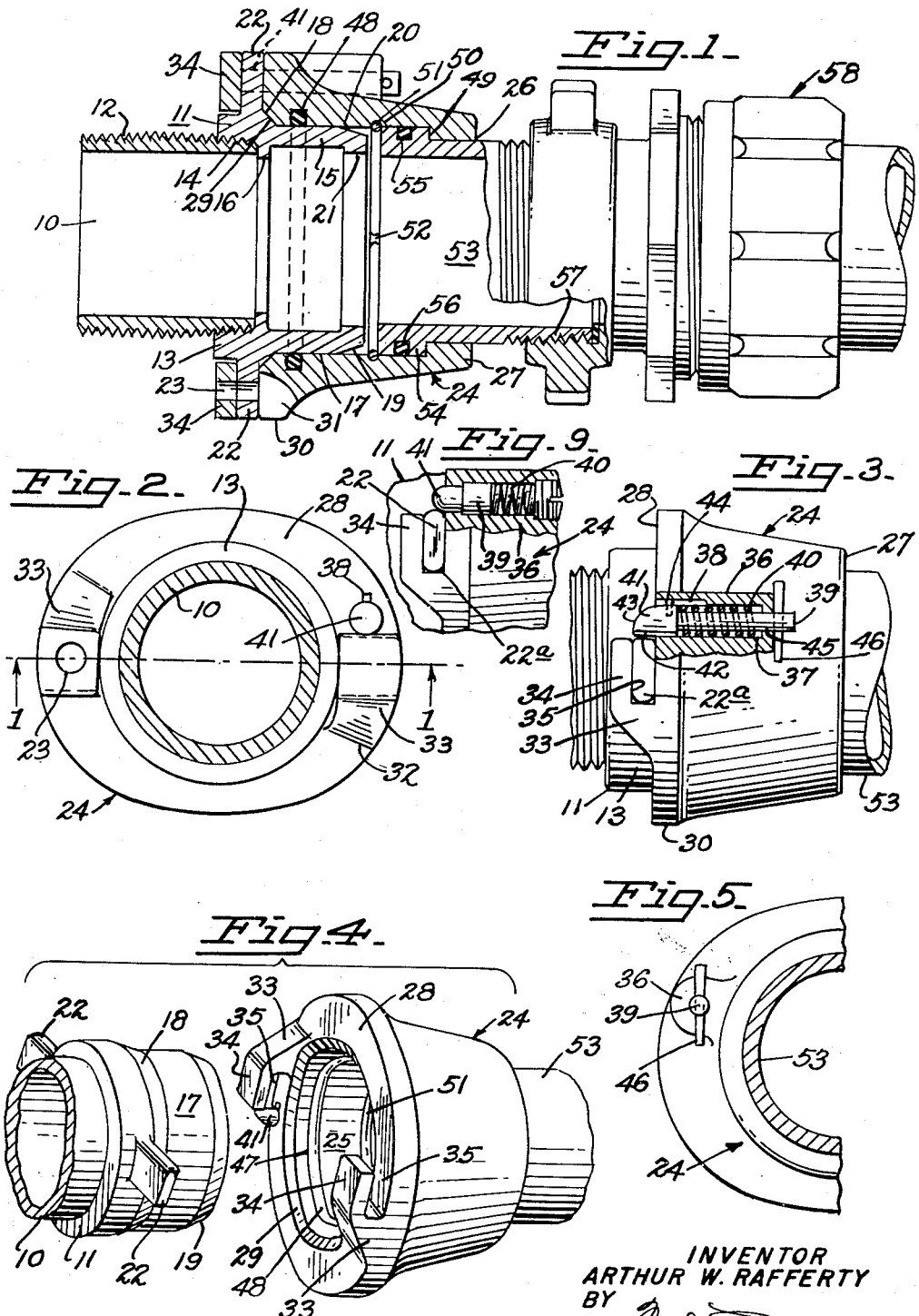

2,684,860

UNITED STATES PATENT OFFICE 2,684,860

QUICK LOCK RING SEAL COUPLING FOR CONDUITS

Arthur W. Rafferty, Sacramento, Calif.

Application March 31, 1951, Serial No. 218,607

7 Claims. (Cl. 285—175)

This invention relates to quick lock ring seal couplings for conduits, and is especially advantageous for use where it is desired to connect a flexible hose in communication with a permanent fixed supply line, though the invention is not thus limited in use and may be also adaptable to couple other forms of conduits such as two flexible hoses.

There are many instances wherein it is desirable to couple one conduit, such as a hose, quickly and securely to another conduit with a leak-proof joint and provide means for locking such connection against inadvertent disconnection, and the forms of the invention exemplified herein are illustrative of certain uses, though not a limitation of other uses. In many such uses it is desirable to provide for swivel action in the coupling, while in other uses such swivel action may not be desirable or essential. In other instances it is desirable to provide a positive lock against inadvertent disconnection of the coupling yet maintain facility of intentional disconnection.

This invention and application has reference to my previously filed co-pending application, Serial No. 163,505 filed May 22, 1950, for Self-Sealing Closure Fitting, since there was disclosed in that application a male stub member for mounting at an outlet of a filler conduit header and a female closure cap therefor, with seal therebetween substantially similar to the seal of the present application.

The present invention is adapted for use with the male stub adapter member of said previous application Serial No. 163,505, and a complemental female coupling member structurally arranged for connection of another conduit to the male coupling of my said co-pending application.

In the forms exemplified in the persent application, the invention provides a tubular male stub adapter member which may be generally similar to the male adapter member of said previously filed co-pending application Serial No. 163,505, and a complemental tubular female coupling cap member, and annular sealing means therebetween preferably of the O-ring type, the cap coupling member being adapted for connection to another conduit, and the coupling including locking means between said male stub and female cap members to prevent inadvertent disconnection of the coupled conduits. Optionally the cap member of the coupling may have means for providing a swivel connection of the conduits relatively.

Varying exemplified forms in which the invention may be embodied are described herein and illustrated in the accompanying drawings in which:

Fig. 1 is an axially longitudinal central section on line 1—1 of Fig. 2, of one form of the coupling of the invention, being partly broken away and having coupled thereto one example of a hose coupling which may be connected to this form of coupling of the invention.

Fig. 2 is an end elevational view of the device of Fig. 1, left toward right in the drawing.

Fig. 3 is a side elevation of Fig. 2.

Fig. 4 is an exploded view in perspective, of parts, partly shown fragmentarily.

Fig. 5 is a fragmentary top view of cap member.

Fig. 6 is an axially longitudinal central section of a modified form of the coupling of the invention, illustrative of adaptation of an extended nipple and elbow for directional change of outlet for the coupling.

Fig. 7 is a view of the bottom end of the coupling shown in Fig. 6 to more particularly show interengaged locking means, and in dash lines the locking lugs at a disengaged position.

Fig. 8 is a fragmentary side elevation of portion of cap member of Fig. 6, mounted on adapter member, showing locking means at an engaged position, and Fig. 9 is a modified form of lock bolt.

In the drawings corresponding parts are indicated by similar reference characters in the several views.

Referring firstly to the exemplification of Figs. 1 to 5, any suitable conduit to which another suitable conduit is to be coupled is indicated 10. The conduit 10 may be a fixed permanently installed conduit or may be a flexible hose and it may be a filling conduit or a dispensing conduit, having in either event means to mount a tubular male stub adapter member 11, such as threads 12. This male stub adapter member may be substantially similar to the male adapter member of my said pending application Serial No. 163,505, and have an annular base ring 13, internally threaded as at 14 to engage the threads 12 of the conduit. The male adapter member has an integral tubular neck or stub 15 axially extended from the base ring, the internal diameter of which is substantially similar to the internal diameter of the connected conduit 10. An internal annular shoulder 16 may be provided intermediate the ends of the stub adapter preferably adjacent the base ring, against which the connected conduit may abut.

The external circumferential face 17 of the neck is smooth and it is preferably substantially perfectly cylindrical from the base ring for the major portion of its axial length, substantially two-thirds of its length being sufficient, though immediately at its juncture with the base the neck is provided with a sharply inclined circumferential outward bevel 18 of approximately 45 degrees to the axis. The neck at its free terminal end portion has an external circumferential conical bevel on taper 19 extending longitudinally along its outer wall and converging inwardly towards a maximum of taper at its open end, substantially one-third of the length of the neck being preferably so tapered. The taper provides an angular sloping shoulder 20 at the juncture of the taper and the cylindrical portion 17. A taper of a few degrees relative to the axis is sufficient, but the angle of the taper has been somewhat exaggerated in the drawing for illustrative purposes. The taper of the bevel 19 is sufficiently sheer so that its lead or outer edge will pass the internal diameter of sealing ring gasket 48 and, upon interengagement of the cylindrical parts, gradually urge the resilient gasket to the proper circumference for sealing between the opposed cylindrical walls.

At its free terminal open end the neck preferably has its wall flanged radially inwardly to provide an internal flange or rim 21, the purpose of which is to provide a wide face and body to the rim at the terminal open end of the neck stub where the end of the stub receives its roughest treatment in use, particularly since the wall at the free terminal end would otherwise be relatively thin due to the maximum effect of the taper at said end.

Externally the base ring 13 of the stub adapter is provided with a plurality of circumferentially spaced locking lugs 22, two being shown relatively oppositely disposed, said lugs extending radially outwardly perpendicular to the base ring preferably sufficiently spaced from the base end thereof so that they may cooperate with sockets on a female coupling cap or bell member to be described. One or more of these lugs 22 may be provided with holes 23 for receiving a lock bar, if desired, though more readily releasable automatic locking means may also be employed, in which event an edge of lugs 22 may be rounded as will be described.

A complemental female tubular cap or bell coupling member generally indicated 24 is provided to fit slidably over the neck 15 of the male stub adapter, the inner wall 25 thereof being substantially cylindrical to fit snugly circumferentially of the neck and having an opening 26 of conduit diameter at its free end 27. At the opposite end of its side wall the cap has an annular base portion 28, and at the opening of the bore at the base end portion the cap has an annular chamfer 29 to seat on the bevel 18 of the male adapter member, the chamfer 29 being both to facilitate the entry of the taper 19 into the cap and to prevent dirt from entering the bore when the chamfer is seated on bevel 18 and the members are connected and in use.

At said base end portion the wall of the cap coupling is preferably made of added thickness so that its annular outer perimeter extends or is flared radially outwardly as at 30 sufficiently to overlie and thus protect the ends of the lock lugs 22 of the adapter stub when the coupling may be dragged around as a coupling member between portable hoses, the enlarged base having an indent 31 therein whereby a lock pin or bar may be inserted through lug opening 23, if such locking means is employed.

As a complemental part of the lock means the end face 32 of the annular base portion has depending therefrom a pair of arms 33 preferably diametrally oppositely spaced in the same manner as lugs 22 of the stub adapter, preferably at 180 degrees relatively. Each of these arms has a retroverted or flanged wing end portion 34 parallel with the face of the base, the flanged wings being spaced from the face of the base a distance substantially equal to the thickness of the lock lugs 22, providing keepers and sockets 35 open at one end, the opening of the sockets 35 facing in opposite directions for receiving said lugs 22 when the latter are entered thereinto by mounting the cap around the neck, and rotation of the cap and the adapter. The locking wings 34 may also have openings 23 therein which register with openings 23 of the lugs 22 when the lugs and wings are overlying in locking engagement, and obviously a lock pin may be inserted therethrough.

In Figs. 1 to 5, the enlarged base portion 28 of the cap is provided with manually releasable snap automatic lock means for locking the male adapter and female cap members against release of the inter-engaged lugs 22 from sockets 35, comprising a bulged portion 36 of the outer wall of the cap and preferably within the limits of the perimeter of the plane of the base 28 closely adjacent the opening of one of the keeper slots, said bulged portion having an axial latch bore 37 therethrough, the bore having an offset guide groove slot 38 adjacent the base. Within this bore is mounted a latch bolt 39 having its shank loaded outwardly through the base face by coiled spring 40 the extended tongue 41 of the latch having a face portion 42 closely slidable perpendicularly across the opening of the lock socket 35 as best shown in Fig. 3, and having an opposite face portion 43 arcuately chamfered to provide yieldable resistance to sliding of lugs 22 therepast. The bolt of the latch mounts in its side wall a guide pin 44 slidable in the guide slot 38. At its opposite end the shank 39 is slidable in an opening 45 which is a reduced portion of the bore, and has therebeyond a transverse stop pin 46, the latter being removable if desired for assembly purposes or replacement of spring, cleaning or lubricating.

Sealing means are provided between the outer face of the wall of the cylindrical neck of the stub adapter and the face of the inner wall of the female cap bore. Adjacently spaced from the base open end of the closure cap, the inner cylindrical side wall 25 of the cap has recessed therein an annular inwardly opening groove 47, preferably rectangular in vertical section, the longitudinal center of the opening of the groove being preferably spaced from the open end of the cap substantially similar to the axial length of the taper 19 of the adapter neck. Within this groove is snugly and removably mounted an annular sealing ring gasket 48 which is of resilient body material, such as rubber composition or some of the more recently developed resilient plastic compositions, which are inherently stretchable to some extent and crowdable by pressure in groove 47 by insertion of neck 17 through the gasket, no invention being claimed herein in the particular composition of the gasket since suitable sealing gaskets for the purpose are purchasable in the commercial market, the preferred type exemplified herein being known in the trade as an O-ring, and substantially circular in a cross-section through the body.

The body of the gasket 48 is of greater cross-sectional diameter than the depth of the groove 47 whereby the sealing face of the gasket extends sufficiently beyond the plane of the cylindrical wall of the bore and groove opening to resiliently contact the outer diameter of the wall of the neck 15 of adapter and be compressed into the groove by insertion of the neck into the cap bore. Such a gasket in a rectangular groove provides a narrow sealing face for contacting the cylindrical wall of the adapter neck whereby friction is reduced to a minimum in mounting or rotating the closure cap. The circular cross section of the gasket body also provides voids in the corners of the groove 47 to allow for displacement of the resilient gasket body when the gasket has pressure exerted thereon responsive to sealing the closure cap on the adapter stub neck.

The opening 26 at the opposite free end of the cap, indicated 27, is adapted for connection thereto of any type of complemental continuation conduit. Such connection may be directly to the cap per se, but in most general uses, it is preferable to make such connection of conduit to the cap by employment of an intervening nipple, as shown by the examples illustrated herein. In the coupling device illustrated in Fig. 1 the nipple is swivelly mounted, whereas in Fig. 6 a tubular nipple is securely mounted, which may be accomplished either by making the extended portion or nipple integral with the cap, or connecting the cap and extended portion by threads as illustrated.

In the swivel nipple extension shown in Fig. 1 the opening 26 of the free end portion of the cap is provided with an inturned shoulder 49, and spaced from the shoulder is an annular groove 50 having mounted therein a spring ring 51 which is radially contractible by means of a slit 52 so that the ring may be conveniently inserted in and removed from the groove for replacement purposes or assembly of parts, the diameter of the cross section of the body of the ring member being substantially greater than the depth of the groove 50 whereby a portion of the body of the ring extends into the bore of the cap member. A tubular nipple member 53 is snugly and swivelly or axially-rotatably mounted in the opening 26 of the free end of the cap member, having an outward annular base flange 54 at its mounted end, one face of the flange being engaged under the shoulder 49, and the opposite face of the flange contacts the body of spring ring 51, whereby the nipple is supported in the cap but may swivel or rotate on its axis. It is to be noted that the free end of the neck of the completely inserted stub adapter is slightly spaced out of contact with the spring ring.

Annular sealing means are provided between the nipple and the inner wall of the cap, which may and preferably does comprise an annular groove 55 in the circumferential face of the base flange 54 of the nipple, and a ring gasket 56 mounted in the groove. The gasket is preferably of the O-ring type similar in operation and construction to the gasket 48, but may advantageously be of somewhat less diameter of body. Alternately, the groove 55 and O-ring 56 may be in the inner wall of the cap, but since it is preferred that the wall of the cap body be externally tapered and therefore of diminished thickness in the zone of the sealing gasket 56, and since the wall of the nipple is of increased thickness at the base flange, it is preferred that the groove 55 be in said flange. Further, it may be desired to securely mount a nipple by threaded connection in the cap member, in which case the groove 55 and gasket 56 would be unnecessary.

The opposite free end of the nipple is provided with suitable means such as threads 57 for connecting any continuation conduit such as the illustrated hose and hose coupling generally indicated 58, though annular barbs on the nipple may be preferred to internally frictionally grip a hose conduit directly to the nipple.

In the form of invention illustrated in Fig. 6, there is provided a coupling especially adapted for a filler pipe or a discharge pipe, wherein it is desired to connect a hose at an angle to the discharge or filler pipe, and wherein simplicity of construction is desired and the feature of a swivel coupling may be eliminated. In such a coupling it may also be desirable to employ strainer members as accessory fittings.

In the modification of Fig. 6 there is a tubular adapter 11 including its base 13 and connecting threads 14 and having cylindrical stub neck 15 structurally similar to that shown in Figs. 1 to 5 and likewise similar to the stub adapter in my said co-pending application, Serial No. 163,505, though if desired, the axial length of the neck portion 15 and the female cap member 24 may be suitably shortened.

The cap member in this modification may be optionally provided with automatic locking means similar to that shown in Figs. 1 to 5, but since this coupling is not usually intended for connecting two portable hose conduits, but rather is usually employed to provide for a horizontal connection of a hose to a vertically disposed pipe, it is not so important that the locking means be automatically locked against inadvertent release, though it should be readily lockable and releasable.

The cap member 24 is provided with a cylindrical internal wall 25 intermediate the ends of which is groove 47 having therein annular sealing gasket 48 preferably of the previously described O-ring type, the external wall of the cap having radially extended therefrom oppositely disposed arms 33 which depend below the lower face of the cap and have the free respective ends thereof turned perpendicularly in opposite directions providing wing flanges 34 which may underlie the lugs 22 of the adapter member. The lugs 22 and the wing flanges 34 each have a hole 23 therethrough through which any suitable lock means may be inserted when the lugs and flanges are in overlying relation by the mounting of the cap on the neck and relative rotation of the cap and adapter.

The opposite end of the cap has conduit opening 26 and at said opening mounts a tubular extension nipple 53, preferably elongated, shown as threadedly mounted, but which may be an integral member if desired.

In order to adapt the coupling to connection to a horizontal conduit such as a hose, there is mounted at the opposite end of the tubular extension 53 one end of an elbow 59 preferably having threadedly mounted at its opposite end a nipple 60 and a removably mounted strainer 61 therein, which may be similar to the nipple and strainer devices of either of my respective patents No. 2,658,625 granted November 10, 1953 or No. 2,647,636, granted August 4, 1953, the nipple and strainer illustrated herein being that of Patent No. 2,658,625.

The mode of operation would appear to be explained by the foregoing description of parts, and may be briefly summarized. Assuming that the stub adapter and the cap are each mounted to a suitable conduit, in order to couple said conduits the neck portion of the stub adapter is inserted into the bore at the base end of the cap member, the taper 19 of the neck facilitating the guiding of the neck into the bore and initially freely past the sealing ring gasket 48. When the neck is sufficiently inserted in the cap so that the portion of the taper closely adjacent to the shoulder 20 engages the sealing gasket, said sealing gasket, by reason of its resilience and the fact that its body diameter is greater than the depth of the groove, is crowded or compressed between the neck wall and the walls of the groove 47 by the further insertion of the neck into the cap. If the preferred form of O-ring gasket is employed the circular cross section of the gasket and the rectangular cross section of the groove permit the material of the O-ring to crowd toward the corners of the groove and yet maintain a relatively narrow line of sealing contact under constant pressure against the walls of the groove and the wall of the neck. This narrow line of sealing contact, particularly in relation to the neck is important because it reduces frictional resistance to insertion of the neck into the cap and to the rotation of the cap on the neck in order to either engage or disengage the locking means.

The most ordinary skill will dictate that the flanged wing 34 of the cap and the extended locking lugs 22 should be offset from alignment when seating the cap on the adapter. With the said wings and lugs offset from alignment the cap may be pressed upon the neck with comparatively little frictional resistance until the cap chamfer 29 seats on the bevel 18 of the stub adapter, at which position the lugs 22 will be in the plane of the oppositely-opening sockets 35 whereupon the cap and stub adapter may be relatively rotated, with similar comparatively small frictional resistance, until the lugs seat in said sockets, thus locking the cap against longitudinal movement relative to the stub adapter, and if it is also desired to stay the members at locked position against relative rotation, a pin or other lock bar may be inserted through the overlying holes 23 of the locking wings and lugs.

If it is desired to employ the automatic lock means as best shown in Fig. 3, the operation is the same as heretofore described, but the lugs 22 are provided with the rounded edges 22a which contact the arcuate face 43 of the spring-loaded lock bolt 39, raising the bolt so that the lug may enter socket 35 and be positively held therein by the reverse snap of the bolt, until intentionally released by manually lifting the bolt by cross pin 46. Since release of the lugs from locked engagement is by rotation of the cap, only one such automatic lock is necessary to prevent inadvertent rotation to release the locking engagement.

Since the coupling of Fig. 1 discloses as a preferred form a swivelly mounted nipple which is axially rotatable, the face of the lock bolt opposed to the opening of the locking socket is preferably perpendicular to the opening of the socket to prevent unlocking by rotation of a hose connected to the swivel nipple. However, it is also contemplated that both of the opposite faces of the latch bolt may be arcuately chamfered in the same manner as indicated at 43, so that the lug 22 may both enter and also be released from the socket by pressure against the latch bolt by rotation of the cap member relative to the stub adapter. This modified form of latch bolt is shown in Fig. 9.

Having described the invention, what is claimed as new and patentable is:

1. A conduit coupling device comprising a tubular stub adapter member having a base end connectible to a conduit and having an externally cylindrical neck portion extending from the base portion, a tubular internally cylindrical cap member having an open base end portion and an internally cylindrical wall portion extended from the base provided with an inner diameter to snugly slide over and circumferentially enclose the neck of the stub adapter whereby the respective inner and outer cylindrical walls of the cap and neck may be confrontingly opposed, said cap being open at its opposite end for connection to another conduit member, said cap member having intermediate the ends of its cylindrical portion an annular groove and an annular resilient sealing gasket mounted therein, and the neck of the stub adapter member having an elongated longitudinal taper at its open inter-engaging end portion, the maximum of the taper being at said open interengaging end of said cylindrical neck and being of a diameter to freely pass said sealing gasket upon inserting the neck of the adapter into the cap, the gasket normally extending beyond the opening of the groove and being crowdable into the groove by insertion of the neck into the cap, and locking means mounted exteriorly of the base of the stub adapter and the cap lockable and releasable by relative rotation of interengaged cap and stub adapter, said gasket holding groove and said taper respectively being positioned in said respective members whereby, when the cylindrical neck of the stub adapter is inter-engaged within the cylindrical cap in seated relation, said gasket resiliently engages the confronting cylindrical portion of the wall of the other interengaged member.

2. A conduit device having the elements of claim 1 and in which said locking means includes oppositely disposed radially extended lugs on one of said members and flanged wings providing sockets on the other of said members, said lugs being adapted for entering said sockets by relative rotation of cap and adapter, the said lugs and wings being adapted for overlying relatively when in locked position, and a spring tensioned latch across the opening of one of the sockets for holding the locking lug in the socket against casual release therefrom.

3. A conduit coupling having the elements of claim 1 and in which an extended tubular nipple is swivelly mounted in the opening at said opposite end of the cap.

4. A conduit coupling device having the elements of claim 1 and in which the sealing gasket in the groove of the cap member is an O-ring and the inter-engaging end of the adapter member is sufficiently beveled to initially pass said O-ring without substantial contact whereby the cylindrical walls of said members may be guided to a coaxial seat one within the other.

5. A conduit coupling device including a tubular stub adapter member having a base end connectible to a conduit and having an externally cylindrical neck portion extending from the base portion, a tubular internally cylindrical cap member having an open base end portion and an internally cylindrical wall portion extended from the base and having inner diameter to snugly slide over and circumferentially enclose the neck of the stub adapter whereby the respective inner and outer cylindrical walls of the cap and neck may be confrontingly opposed, said cap being open at its opposite end and having means at said opposite end for swivelly connecting another conduit member thereto, said cap member having intermediate the end of its cylindrical portion an annular groove, an annular resilient sealing gasket mounted in said groove and being circular in cross-section through its body whereby its contacting sealing face is relatively narrow, and the neck of the stub adapter member having an elongated taper longitudinally of its cylindrical wall at its open inter-engaging end portion, the maximum of the taper being at said open inter-engaging end of said cylindrical neck and being of a diameter to freely pass said sealing gasket upon insertion of the neck of the adapter into the cap, the gasket normally extending beyond the opening of the groove and being crowdable into the groove by inserting of the neck into the cap, and means exterior of the adapter and cap members and operable by rotation of seated cap on the adapter for releasably locking them relatively, and means automatically operable by said rotation for holding said coupling members in locked relation against inadvertent unlocking thereof, the said gasket holding groove and said taper respectively being positioned in said respective members whereby when the cylindrical neck of the stub adapter is inter-engaged within the cylindrical cap in seated relation, said gasket resiliently engages the cylindrical portion of the wall of the other interengaging member.

6. A conduit coupling device having the elements of claim 5, the said locking means including oppositely disposed radially extended lugs on one of the members and flanged wings providing sockets on the other of said members, said lugs being adapted for entering said sockets by relative rotation of the cap and adapter member, and the said lugs and wings being adapted for slidable inter-engagement and overlying relatively when in locked position.

7. A coupling device of the character described having the elements of claim 5, the opening of the cap opposite the base having swivelly mounted therein an extended tubular nipple and spring ring means for supporting the end of the nipple in the cap, said spring ring being mounted in a groove in the inner wall of the cap and having its body of greater thickness than the depth of the groove whereby the inner circumferential portion of the body of the spring ring extends into the tubular bore in the cap for supporting the swivelly mounted nipple in said open end of the cap.

References Cited in the file of this patent

UNITED STATES PATENTS

| Number | Name | Date |
| --- | --- | --- |
| 170,457 | White | Nov. 30, 1875 |
| 238,437 | Reynolds et al. | Mar. 1, 1881 |
| 458,636 | Meilink et al. | Sept. 1, 1891 |
| 767,843 | Smith | Aug. 16, 1904 |
| 2,394,364 | Christensen | Feb. 5, 1946 |
| 2,449,659 | Lane | Sept. 21, 1948 |
| 2,574,625 | Coss | Nov. 13, 1951 |